No. 639,947. Patented Dec. 26, 1899.
A. SUNDH.
COMPRESSED AIR MOTOR APPARATUS.
(Application filed Apr. 1, 1899.)

(No Model.) 2 Sheets—Sheet 1.

Witnesses:
C. L. Belcher
C. Sedgwick

Inventor
A. Sundh
By
A. P. Thayer
Attorney

THE NORRIS PETERS CO., PHOTO-LITHO., WASHINGTON, D. C.

No. 639,947. Patented Dec. 26, 1899.
A. SUNDH.
COMPRESSED AIR MOTOR APPARATUS.
(Application filed Apr. 1, 1899.)

(No Model.) 2 Sheets—Sheet 2.

Witnesses:
C. L. Belcher
C. Sedgwick

Inventor
A. Sundh
By
A. P. Thayer
Attorney

THE NORRIS PETERS CO., PHOTO-LITHO., WASHINGTON, D. C.

UNITED STATES PATENT OFFICE.

AUGUST SUNDH, OF YONKERS, NEW YORK.

COMPRESSED-AIR MOTOR APPARATUS.

SPECIFICATION forming part of Letters Patent No. 639,947, dated December 26, 1899.

Application filed April 1, 1899. Serial No. 711,327. (No model.)

*To all whom it may concern:*

Be it known that I, AUGUST SUNDH, a citizen of the United States of America, and a resident of Yonkers, county of Westchester, and State of New York, have invented certain new and useful Improvements in Compressed-Air Motor Apparatus, of which the following is a specification.

My invention relates to means of reheating the expanded and cooled air and protecting the motor apparatus from freezing by the refrigerating action of the air in passing through the reducing-valve and connecting-pipes and in doing work in the engine; and it consists in means for utilizing the heating action of an electric circuit for this purpose.

The essential object of the invention is for application to cars and other motor-vehicles, as hereinafter described, reference being made to the accompanying drawings, in which a street-car is represented for illustration of the invention.

Figure 1:
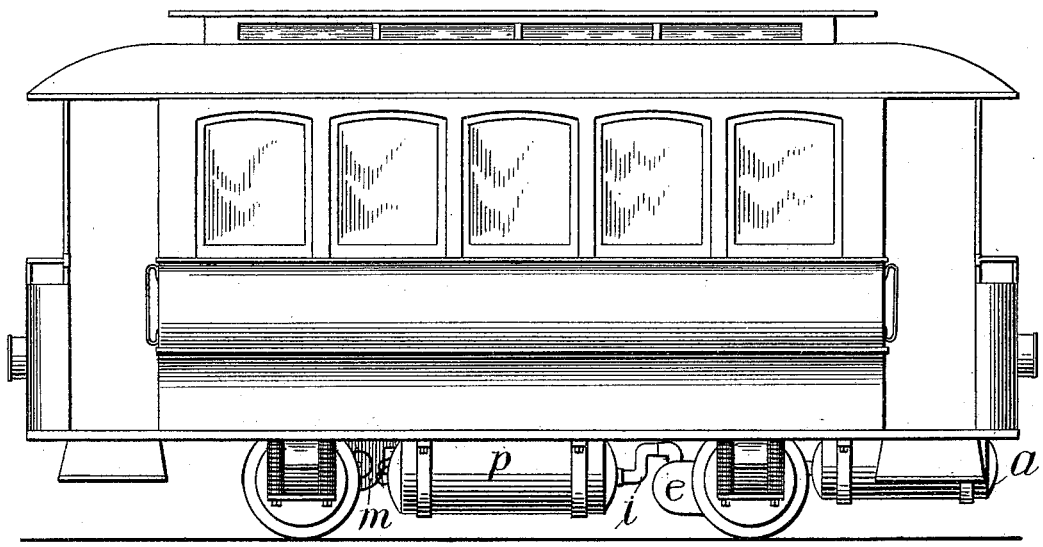
Figure 2:
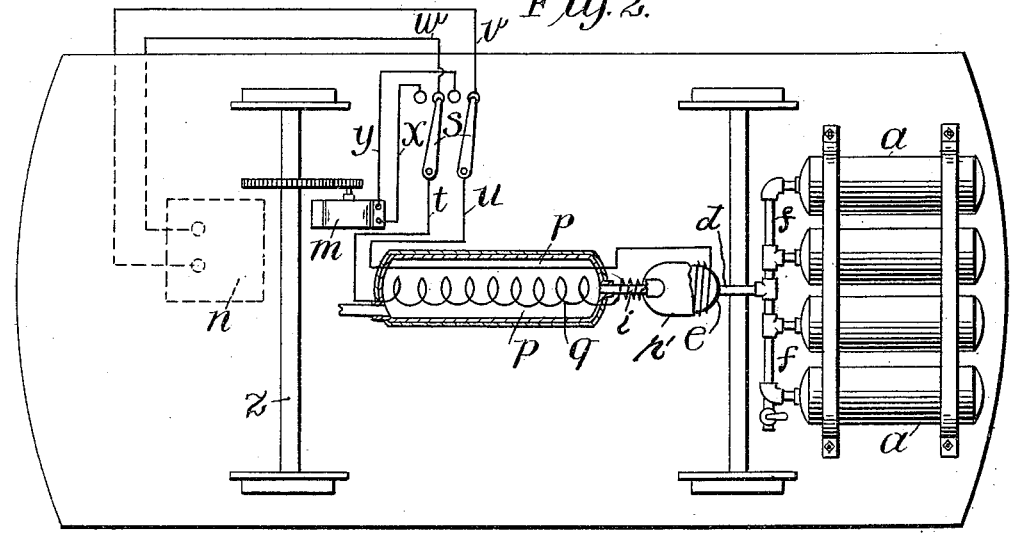
Figure 3:
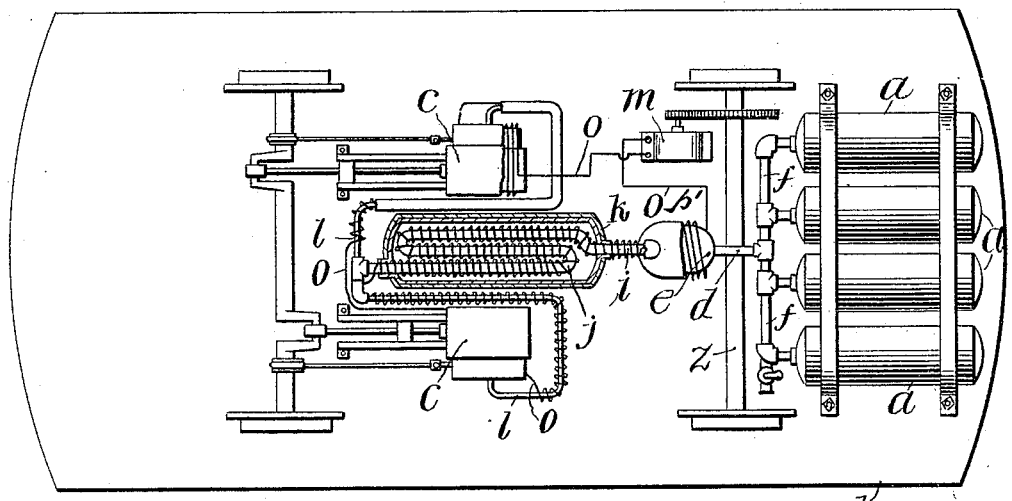
Figure 4:
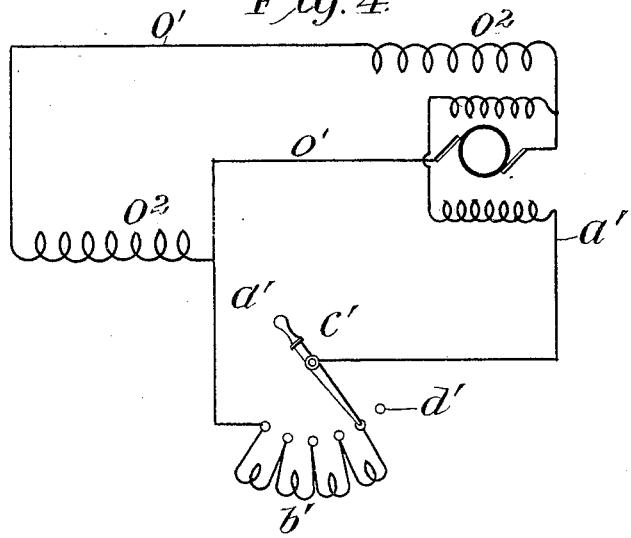
Figure 5:
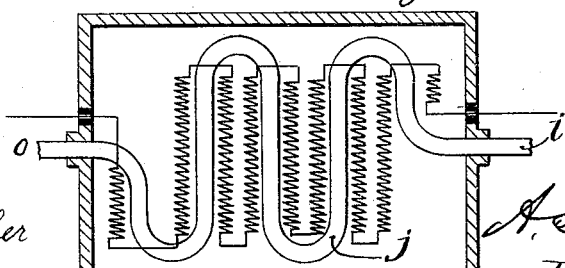

Figure 1 is a side elevation of a car equipped with storage-retorts, reducing apparatus, and electric heating apparatus in accordance with my invention. Fig. 2 is a plan of the car inverted and showing the storage-retorts, reducing-valve, heating-chamber, and electric heating apparatus, the heating-chamber being in horizontal section. Fig. 3 is another like plan with a modified form of the heating apparatus and also showing the motor-engines. Fig. 4 is a diagram of the electric circuit with a resistance-coil for graduating the heat according to requirement or shutting it off altogether, and Fig. 5 is a diagram of a modification in the heating apparatus.

Instead of heating the air and depending upon the air so heated for protecting the motor apparatus, as now generally practiced, I propose to employ an electric current or currents and utilize the same in application both to the air and the motor apparatus, using either a generator actuated by some moving part of the car or by other means or storage batteries carried on the car, or both may be used to produce the current, as follows:

The compressed air will be carried in storage tanks or retorts $a$ of any approved form suitably mounted on the car, preferably under the platforms $b$, to be charged at the station, as usual. In this example I represent one series only of such retorts connected under the platform at one end, but will in practice apply another series at the other end and others also, if required. As the retorts are charged at much greater pressure than is feasible to work in the motor-engines $c$, a reducing-valve has to be used in the conducting-pipe $d$, leading from the retorts to the engines, for reducing the pressure within practicable limits. Any approved form of reducing-valve may be used. As the nature of such valves is well understood, it is unnecessary to represent it in detail. I have therefore only indicated it in outline at $e$, the storage-tanks being suitably connected with it through pipes $f$ and $d$ for supplying the air thereto. From the reducing-valve the air, which is considerably cooled by the expansion which occurs by the reduction of pressure, may be conducted to the motor-engine in various ways, and however it is conducted should for the best effects be subject to heat applied all the way, or practically so, the amount of heat necessary when reduced from such high pressure being very considerable. In Figs. 1 and 2 I represent an expansion-chamber $p$ connected with the discharge side of the reducing-valve for receiving the expanded air, from which it is to be conducted to the motor-engine by a pipe or pipes in the usual way. In Fig. 3 the discharge-pipe $i$ of the reducing-valve is continued in a coil $j$, inclosed in a jacketed heating-box $k$ and through the same into branches $l$, leading to the respective cylinders $c$ of the motor-engines. To apply the heat in such arrangements from a generator, as $m$, or storage battery, as $n$, the electric conductor $o$ from the one is preferably first applied to the reduction-valve $e$ by coiling around it, as shown, under cover of an insulating-jacket $p'$, which is partly broken out to show the wire. From the reducing-valve the electric wire $o$ continues along pipe $i j$, either being coiled around it, as shown in Fig. 1, or in any other suitable relation to it—as, for example, alongside of it, as in Fig. 5—thence along one of the pipes $l$ to and around one of the cylinders $c$, thence along the other pipe $l$ to and around the other cylinder $c$, and thence returning to the generator or battery, as shown, or in any other approved arrangement of the circuit.

In Fig. 2 an expansion-tank $p$ is represented, which is also a heating-chamber, into which the air is to be discharged directly from the reducing-valve, with a heating-coil $q$ contained in said chamber, said coil being also in suitable connection with the reducing-valve. The motor-engine is not represented in this figure, being sufficiently illustrated in Fig. 3 for a full understanding of the invention, it being noted that the motor-engine may be included in the heating-circuit in any approved way.

With the storage battery indicated at $n$ (dotted) in Fig. 2 which may be used instead of the generator $m$, is provided suitable switches $s$ for connecting the heating circuit-wires $t$ $u$ with its circuit-wires $v$ $w$ or the motor-circuit $x$ $y$.

The generator $m$ will be geared with the car-axle $z$ or any other moving part, as shown, or in any approved way, being only required to take effect when the car is running; but it will be desirable to vary the intensity of the heat, as the volume of air and amount of power used varies with the varying resistances due to different grades, light and heavy loads, and the like. This may be provided for in the usual way of regulating the current indicated in the diagram, Fig. 4, wherein $o'$ indicates the armature-circuit, including the heating-coils $o^2$. $a'$ indicates a field-circuit, $b'$ a resistance-coil in the field-circuit, and $c'$ the switch for varying the exciting-current, the switch to be subject to the control of the motorman for varying the current at will and being independent of the engine-controlling valve, so that the electric current may be shut off altogether or be otherwise regulated independently of the regulation of the motive power, which must vary in such wide ranges, owing to the great variations of the resistance to which cars are subject, that uniformity in variations of the electric current and the motive power is not feasible. When running down grades and under other conditions with the air entirely shut off, the switch may be shifted over to the point $d'$ to open the circuit and interrupt the current altogether.

It will be understood that the invention is alike applicable to compressed-air motors used for any other purpose, as operating elevators in cases where the compressed air may be obtained from a central station. In such case the current may be obtained from the public-service circuits, or from storage batteries, or a generator, same as when used in a vehicle. The generator may be geared with the air-motor for its operation.

What I claim as my invention is—

1. In compressed-air car-motor apparatus, the combination of a source of compressed air, an air-operated motor-engine, an electric air-heater intermediate of the compressed-air source and the engine, an electric heater for the engine, said heaters connected in series, means for supplying the electric current, a controlling-resistance for the electric current and a compressed-air regulator, said regulators being independent of each other.

2. In compressed-air car-motor apparatus, the combination of a source of compressed air, an air-operated motor-engine, an air-pressure regulator intermediate of the source of compressed air and the motor-engine, an electric heater for the pressure-regulator, an electric heater for the air intermediate of said pressure-regulator and the motor-engine, an electric heater for said engine, said heaters connected in series and having a regulator independently of the compressed-air regulator, and a generator for the electric current geared with the car-axle.

Signed by me at New York, N. Y., this 30th day of March, 1899.

AUGUST SUNDH.

Witnesses:
A. P. THAYER,
C. SEDGWICK.